United States Patent
Nishikawa et al.

(10) Patent No.: US 10,474,924 B2
(45) Date of Patent: Nov. 12, 2019

(54) INFORMATION PROCESSING SYSTEM, IMAGE PROCESSING APPARATUS, STORAGE MEDIUM AND INFORMATION PROCESSING METHOD

(71) Applicant: NINTENDO CO., LTD.

(72) Inventors: Takeshi Nishikawa, Kyoto (JP); Yoshiyasu Ogasawara, Kyoto (JP); Yasuyuki Shimohata, Kyoto (JP); Yuki Tanaka, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 88 days.

(21) Appl. No.: 15/496,023

(22) Filed: Apr. 25, 2017

(65) Prior Publication Data

US 2017/0318241 A1  Nov. 2, 2017

(30) Foreign Application Priority Data

Apr. 28, 2016 (JP) ................................. 2016-090359

(51) Int. Cl.
*H04N 5/357* (2011.01)
*H04N 5/33* (2006.01)
*G06K 9/62* (2006.01)

(52) U.S. Cl.
CPC ............. *G06K 9/6202* (2013.01); *H04N 5/33* (2013.01)

(58) Field of Classification Search
CPC .......... H04N 5/357; H04N 5/33; G06K 9/6202
See application file for complete search history.

(56) References Cited

U.S. PATENT DOCUMENTS

| 2014/0028861 | A1* | 1/2014 | Holz | H04N 5/23277 |
| | | | | 348/208.4 |
| 2016/0063711 | A1* | 3/2016 | Ogasawara | H04N 5/332 |
| | | | | 348/164 |

FOREIGN PATENT DOCUMENTS

JP          2003-181137          7/2003

* cited by examiner

*Primary Examiner* — Mainul Hasan
(74) *Attorney, Agent, or Firm* — Nixon & Vanderhye PC

(57) ABSTRACT

A non-limiting example information processing apparatus includes a processor, and an infrared LED and an imaging device are connected to the processor. The processor controls on/off of the infrared LED, and an image sensor images infrared images according to switching timings thereof. An image processing circuit estimates an influence (situation) of noise such as sunlight etc. based on respective infrared images at times when the infrared LED is turned on and off, and determines at least advisability of use of the imaging device (infrared sensor). A determination result about the advisability of use is applied to the processor from the image processing circuit, and when it cannot be used, a message to that effect is displayed on an LCD.

16 Claims, 9 Drawing Sheets

WHEN INFRARED LED ON    100

WHEN INFRARED LED OFF    150

DIFFERENCE    200

WHEN INFRARED LED ON    100

WHEN INFRARED LED OFF   150

DIFFERENCE    200

INFORMATION PROCESSING SYSTEM, IMAGE PROCESSING APPARATUS, STORAGE MEDIUM AND INFORMATION PROCESSING METHOD

CROSS REFERENCE OF RELATED APPLICATION

The disclosure of Japanese patent application No. 2016-090359 filed on Apr. 28, 2016 is incorporated by reference.

FIELD

This application describes an information processing system, an image processing apparatus, a storage medium and an information processing method, which perform information processing with using an output of an infrared sensor.

SUMMARY

It is a primary object of an embodiment(s) to provide a novel information processing system, image processing apparatus, storage medium and information processing method.

It is another object of the embodiment(s) to provide an information processing system, image processing apparatus, storage medium and information processing method, capable of determining advisability of use of an output an infrared sensor.

A first embodiment is an information processing system comprising a light emitting portion, a control portion, an imaging portion, a first acquisition portion, a second acquisition portion, a comparison portion, and an estimation portion. The light emitting portion is configured to emit infrared rays. The control portion is configured to control driving and stopping of the light emitting portion. The imaging portion is configured to image an infrared image. The first acquisition portion is configured to acquire a first infrared image that is imaged by the imaging portion when the light emitting portion is driven by the control portion. The second acquisition portion is configured to acquire a second infrared image that is imaged by the imaging portion when the light emitting portion is stopped by the control portion. The comparison portion is configured to compare a first analysis result of the first infrared image that is acquired by the first acquisition portion with a second analysis result of the second infrared image that is acquired by the second acquisition portion. The estimation portion is configured to estimate based on a comparison result of the comparison portion a noise situation of the infrared image that is imaged by the imaging portion.

According to the first embodiment, since the noise situation of the infrared image is estimated, it is possible to determine based on the noise situation whether an output of an infrared sensor such as the imaging portion can be used for information processing. As a result thereof, it is possible to stop in advance performing of the information processing using the output of the infrared sensor. Moreover, it is possible to perform the information processing except processing that uses the output of the infrared sensor.

A second embodiment is the information processing system according to the first embodiment, wherein a light emitting direction of the light emitting portion and an imaging direction of the imaging portion are substantially corresponding to each other. Therefore, an infrared image including light that the infrared rays emitted light from the light emitting portion are reflected is imaged by the imaging portion.

According to the second embodiment, it is possible to image an infrared image including a part of a body of a user who uses a unit having at least the light emitting portion and the imaging portion.

A third embodiment is the information processing system according to the first embodiment, wherein the first analysis result includes first brightness information related to brightness of the first infrared image and the second analysis result includes second brightness information related to brightness of the second infrared image. The comparison portion is configured to compare the first brightness information with the second brightness information.

According to the third embodiment, since only information related to the brightness of the infrared image is compared, estimation of the noise situation is simple.

A fourth embodiment is the information processing system according to the third embodiment, wherein the first brightness information includes information about a first pixel number each having a brightness equal to or larger than a predetermined value in the first infrared image. The second brightness information includes information about a second pixel number each having brightness equal to or larger than the predetermined value in the second infrared image.

According to the fourth embodiment, since the noise situation is estimated based on a result of having determined whether the pixel has a brightness equal to or larger than the predetermined value per pixel, the noise situation can be estimated comparatively accuracy.

A fifth embodiment is the information processing system according to the third embodiment, wherein the first brightness information includes information about a first average value that is obtained by averaging the brightness values of the pixels in a predetermined range (all the pixels or a certain region) in the first infrared image. The second brightness information includes information about a second average value that is obtained by averaging the brightness values of the pixels in a predetermined range in the second infrared image.

According to the fifth embodiment, even if the average value that is obtained by averaging the brightness values about the pixels in the predetermined range of the infrared image is calculated, the noise situation can be estimated.

A sixth embodiment is the information processing system according to the fourth embodiment, wherein the first brightness information further includes information about a first average value that is obtained by averaging the brightness values of the pixels in a predetermined range in the first infrared image, and the second brightness information further includes information about a second average value that is obtained by averaging the brightness values of the pixels in a predetermined range in the second infrared image. The estimation portion is configured to estimate the noise situation based on information of the first pixel number and information of the second pixel number, and estimate the noise situation based on the information about the first average value and the information about the second average value. For example, any one of estimation results may be adopted, or both of the estimation results may be combined.

In also the sixth embodiment, the noise situation can be estimated.

A seventh embodiment is the information processing system according to the third embodiment, wherein the comparison portion includes an evaluation value calculation portion configured to calculate an evaluation value related to the infrared image that is imaged by the imaging portion with using the first brightness information and the second brightness information. The estimation portion is configured to estimate the noise situation according to the evaluation value that is calculated by the evaluation value calculation portion.

According to the seventh embodiment, since the noise situation is estimated based on the evaluation value, estimation of the noise situation is simple.

An eighth embodiment is the information processing system according to the seventh embodiment, further comprising a first determining portion. The first determining portion is configured to determine based on the evaluation value that is calculated by the evaluation value calculation portion whether predetermined processing is to be performed. The predetermined processing is processing of processing different from the information processing (application processing) or a part of the information processing, for example. Hereinafter, the same will be applied to the same situation.

According to the eighth embodiment, it is possible to simply determine whether the predetermined processing is to be performed based on the evaluation value.

A ninth embodiment is the information processing system according to the eighth embodiment, wherein the first determining portion is configured to determine at least one of advisability of use of an output of the imaging portion and advisability of notification of a predetermined content.

A tenth embodiment is the information processing system according to the eighth embodiment, wherein the first determining portion is configured to determine based on one or more evaluation values calculated by the evaluation value calculation portion whether the predetermined processing is to be performed.

According to the tenth embodiment, since it is determined whether the predetermined processing is to be performed based on one or more evaluation values, it is possible to properly determine whether the predetermined processing is to be performed based on a content of the predetermined processing, for example.

An eleventh embodiment is the information processing system according to the tenth embodiment, wherein the first determining portion is configured to determine that the predetermined processing is to be performed when a third average value that is obtained by averaging a plurality of evaluation values satisfies a predetermined first condition.

According to the eleventh embodiment, since the average value that is obtained by averaging a plurality of evaluation values is calculated, it is possible to prevent erroneous determination from being made due to temporary fluctuation of the evaluation value.

A twelfth embodiment is the information processing system according to the eleventh embodiment, wherein determination by the first determining portion is repeatedly performed not only at a time of starting the system but also at a time of staring an information processing program. In this case, the third average value is calculated by averaging a plurality of evaluation values for a predetermined time period at every time that an evaluation value is calculated by the evaluation value calculation portion. That is, a moving average of the evaluation value is calculated.

According to the twelfth embodiment, since the moving average of the evaluation value is calculated, it is possible to determine in real time whether the predetermined processing is to be performed.

A thirteenth embodiment is the information processing system according to the tenth embodiment, wherein the first determining portion is configured to determine that the predetermined processing is not to be performed when any one of the one or more evaluation values does not satisfy the first condition.

According to the thirteenth embodiment, for example, when performing predetermined processing that is easy to be subjected to the influence of noise, it is possible to properly determine whether the predetermined processing is to be performed.

A fourteenth embodiment is the information processing system according to the tenth embodiment, wherein the first determining portion is configured to determine that the predetermined processing is not to be performed when the predetermined number of the evaluation values successively calculated out of the one or more evaluation values do not satisfy the first condition.

According to the fourteenth embodiment, it is possible to prevent erroneous determination from being made due to temporary fluctuation of the evaluation value.

A fifteenth embodiment is the information processing system according to the eleventh embodiment, further comprising a second determining portion. The second determining portion is configured to determine whether the predetermined processing is to be performed dependent on whether the first average value or the second average value satisfies a second condition eased than the first condition. When determining that the predetermined processing is not to be performed by the first determining portion, it is determined whether the predetermined processing is to be performed by the second determining portion.

According to the fifteenth embodiment, it is possible to determine whether the predetermined processing is to be performed in two steps.

A sixteenth embodiment is the information processing system according to the fifteenth embodiment, wherein when it is determined by the first determining portion that the predetermined processing is not to be performed, it is determined by the second determining portion whether the predetermined processing is to be performed.

According to the sixteenth embodiment, for example, even when the noise included in the infrared image is comparatively large, there is a case where the predetermined process can be performed depending on a determination result of the second determining portion.

A seventeenth embodiment is the information processing system according to the eleventh embodiment, further comprising a second determining portion configured to determine whether the predetermined processing is to be performed dependent on whether the first average value or the second average value satisfies a second condition eased than the first condition. When determining that the predetermined processing is to be performed by the second determining portion, it is determined by the first determining portion whether the predetermined processing is to be performed. Therefore, when determining that the predetermined processing is not to be performed by the second determining portion, determination processing by the first determining portion is not performed.

According to the seventeenth embodiment, since the determination processing by the first determining portion is not performed when it is determined by the second determining portion that the predetermined processing is not to be performed, it is avoidable that unnecessary processing is performed. Therefore, a processing load of a processor can be reduced.

An eighteenth embodiment is the information processing system according to the first embodiment, further comprising a decision portion. The decision portion is configured to decide based on a comparison result of the comparison portion whether predetermined processing using the infrared image that is imaged by the imaging portion is to be performed.

According to the eighteenth embodiment, since it is determined whether the predetermined processing is to be performed, when there are many noises included in the infrared image, it is possible to decide not to perform the predetermined processing.

A nineteenth embodiment is the information processing system according to the first embodiment, further comprising a notification portion. The notification portion is configured to notify a predetermined content based on a comparison result of the comparison portion. For example, the predetermined content is the noise situation or/and the advisability of use of the imaging portion.

According to the nineteenth embodiment, since the predetermined content is notified, a user can know whether processing using the imaging portion can be performed.

A twentieth embodiment is the information processing system according to the nineteenth embodiment, wherein the notification portion is configured to display the predetermined content on a display portion. For example, a message about the predetermined content is displayed.

According to the twentieth embodiment, the user can visually confirm the predetermined content.

A twenty-first embodiment is the information processing system according to the first embodiment, wherein the estimation portion is configured to estimate the noise situation of at least the first infrared image that is acquired by the first acquiring portion.

A twenty-second embodiment is an image processing apparatus comprising a comparison portion and an estimation portion. The comparison portion is configured to compare a first analysis result of a first infrared image that is imaged when infrared rays are emitted with a second analysis result of a second infrared image that is imaged when the infrared rays are not emitted. The estimation portion is configured to estimate a noise situation of the imaged infrared image based on a comparison result of the comparison portion.

A twenty-third embodiment is the image processing apparatus according to the twenty-second embodiment, further comprising a light emitting portion configured to emit infrared rays; a control portion configured to control driving and stopping of the light emitting portion; an imaging portion configured to image an infrared image; a first acquisition portion configured to acquire a first infrared image that is imaged by the imaging portion when the light emitting portion is driven by the control portion; and a second acquisition portion configured to acquire a second infrared image that is imaged by the imaging portion when the light emitting portion is stopped by the control portion.

A twenty-fourth embodiment is a non-transitory storage medium storing an information processing program, wherein the information processing program causes a computer comprising a light emitting portion configured to emit infrared rays and an imaging portion configured to image an infrared image to perform: a controlling step configured to control driving and stopping of the light emitting portion; a first acquisition step configured to acquire a first infrared image that is imaged by the imaging portion when the light emitting portion is driven by the controlling step; a second acquisition step configured to acquire a second infrared image that is imaged by the imaging portion when the light emitting portion is stopped by the controlling step; a comparison step configured to compare a first analysis result of the first infrared image that is acquired in the first acquisition step with a second analysis result of the second infrared image that is acquired in the second acquisition step; and an estimation step configured to estimate based on a comparison result in the comparison step a noise situation of the infrared image that is imaged by the imaging portion.

A twenty-fifth embodiment is an information processing method in the information processing system comprising a light emitting portion configured to emit infrared rays and an imaging portion configured to image an infrared image, comprising steps of: (a) controlling driving and stopping of the light emitting portion; (b) acquiring a first infrared image that is imaged by the imaging portion when the light emitting portion is driven in the step (a); (c) acquiring a second infrared image that is imaged by the imaging portion when the light emitting portion is stopped in the step (a); (d) comparing a first analysis result of the first infrared image that is acquired in the step (b) with a second analysis result of the second infrared image that is acquired in the step (c); and (e) estimating based on a comparison result in the step (d) a noise situation of the infrared image that is imaged by the imaging portion.

Also in the twenty-second, twenty-fourth and twenty-fifth embodiments, it is possible to determine whether an output of an infrared sensor can be used for information processing, like the first embodiment.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

First Embodiment

Figure 1:
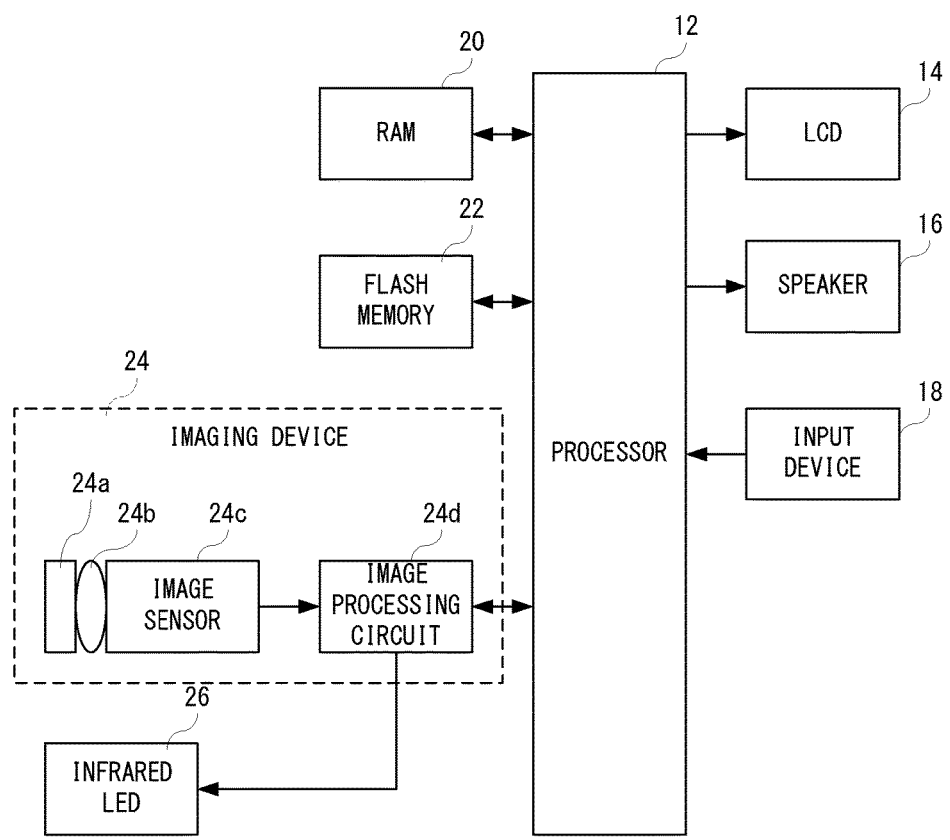
FIG. 1 is a block diagram showing non-limiting example electric structure of an information processing apparatus.

With reference to FIG. 1, a non-limiting example information processing apparatus 10 includes a processor 12, and an LCD 14, a speaker 16, an input device 18, a RAM 20, a flash memory 22 and an imaging device 24 are connected to this processor 12. Moreover, the information processing apparatus 10 includes an infrared LED 26, and the infrared LED 26 is connected to an imaging device 24 (image processing circuit 24d).

The processor 12 is in charge of overall control of the information processing apparatus 10. The LCD 14 is a display for displaying a screen or image corresponding to image data that is output from the processor 12. Although the LCD 14 is provided in this first embodiment, an organic electroluminescence display may be provided. The speaker 16 outputs an analog sound signal that is converted from sound data that is output from the processor 12. The input device 18 is a hardware operation portion provided on the information processing apparatus 10, which includes at least one of a push button, a cross button, a slide switch and a touch panel.

The RAM 20 is a volatile storage, and used as a working area and a buffer area for the processor 12 and the image processing circuit 24d. The flash memory 22 is a non-volatile storage, and stores a program (an information processing program or an application program) to be executed by the information processing apparatus 10, save data, etc.

The imaging device 24 also functions as an image processing apparatus, and images (photographs) an infrared image, performs predetermined processing based on image data corresponding to the imaged infrared image, and applies to the processor 12 a result of the predetermined processing. This imaging device 24 is also called an infrared sensor, and includes an infrared filter 24a, a lens 24b, an image sensor 24c and image processing circuit 24d. However, a device or unit having the imaging device 24 and the infrared LED 26 may be called an infrared sensor.

The infrared filter 24a blocks visible light and transmits only infrared rays. The lens 24b focuses the infrared rays transmitted through the infrared filter 24a so as to make incident on the image sensor 24c. The image sensor 24c is a solid state image sensing device such as a CMOS sensor or CCD, for example, and images the infrared rays focused by the lens 24b. Therefore, the image sensor 24c images (photographs) only the infrared rays transmitted through the infrared filter 24a, and produces an image (infrared image). The infrared image produced by the image sensor 24c is converted into digital image data by an A/D converter not shown so as to be subjected to predetermined processing by the image processing circuit 24d. The image processing circuit 24d is constituted with a DSP, for example, and performs predetermined processing according to the program(s) stored in the RAM 20. Although the predetermined processing will be described in detail later, in this first embodiment, it includes first processing for obtaining a processing result (sensor output) to be used for information processing (application processing) and second processing for determining in the information processing at least whether an output of the image processing circuit 24d (imaging device 24) can be used for information processing.

The infrared LED 26 is an LED that emits (radiates) infrared rays (infrared light), and is controlled to be turned-on and -off by the image processing circuit 24d (DSP).

In addition, although illustration and description about an appearance configuration of the information processing apparatus 10 are omitted, the imaging device 24 and infrared LED 26 are provided so that an imaging surface (side) of the imaging device 24 and a light emitting surface (side) of the infrared LED 26 are arranged in the same surface (plane) of a housing of the information processing apparatus 10. That is, an imaging direction of the imaging device 24 and a direction of the infrared rays radiated (light emitting direction) from the infrared LED 26 are corresponding to each other. However, it is not necessary for the imaging direction and the light emitting direction to completely correspond to each other, and some deviation is permitted. That is, it is sufficient that the imaging direction and the light emitting direction are substantially (approximately) corresponding to each other.

Moreover, the information processing apparatus 10 shown in FIG. 1 is an example, and should not be limited. For example, a sensor for detecting a direction (posture) or/and a motion of the information processing apparatus 10 may be provided. As such a sensor, an acceleration sensor or/and a gyro sensor are applicable.

In the information processing apparatus 10 having such structure, if an imaging instruction is applied to the imaging device 24 from the processor 12, until an instruction of ending the imaging is given, imaging processing is periodically (at every 0.5 frames, for example) performed. The infrared LED 26 is controlled to be turned on or off in agreement with timings that this imaging processing is performed periodically. Therefore, in the imaging device 24 (image processing circuit 24d), an infrared image when the infrared LED 26 is turned on and an infrared image when the infrared LED 26 is turned off are alternately acquired. However, a frame is a unit time for updating the screen displayed on the LCD 14, and one (1) frame is ⅓₀ seconds or 60 1/seconds, for example.

The image processing circuit 24d calculates a difference between an infrared image when the infrared LED 26 is turned on (hereinafter, may be called a "first infrared image) and an infrared image when the infrared LED 26 is turned off (hereinafter, may be called a "second infrared image), which are imaged successively, recognizes a finger or face (head), for example of a user of the information processing apparatus 10 included in an image of difference (difference image), and applies coordinate data of a position corresponding to the finger or face (head) that is recognized in the difference image. Thus, processing of acquiring the first infrared image and the second infrared image, calculating the difference image thereof, and applying the coordinate data of the position corresponding to the image of a part of a body of the user to the processor 12 is the first processing.

However, it is not necessary to be limited to a part of the body of the user, such as a finger or face, and there is an occasion that a predetermined object held by or attached to the user is recognized based on the first infrared image and the second infrared image, and coordinate data of a position corresponding to the recognized predetermined object is applied to the processor 12.

Figure 2A:
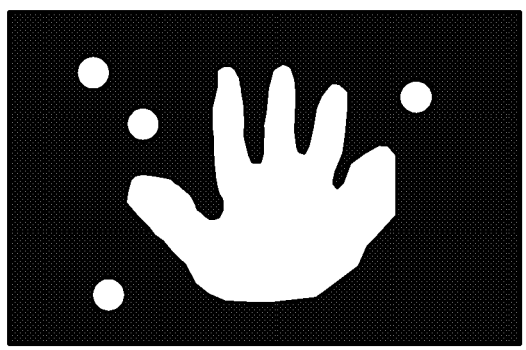
FIG. 2(A) is an illustration view showing a non-limiting example infrared image when an infrared LED is turned on in a case where there is little influence by noise.

An example of the first infrared image 100 when the infrared LED 26 is turned on (at an on-time) is shown in FIG. 2(A), for example. In this first infrared image 100, a part or region indicated by black is a dark (low brightness) part or region, and a white part or region is bright (high brightness) part or region. This is the same for other infrared images and difference images.

Returning to FIG. 2(A), in this first infrared image 100, an image of a palm of the user is included in its center, and an image due to noise is included in a part around the palm. However, the image of the palm is an image based on the reflected light that the infrared rays irradiated from the infrared LED 26 are reflected by the palm of the user. Moreover, when the information processing apparatus 10 is indoors, for example, a noise is typically caused by sunlight comes through a window or/and light of a fluorescent lamp of the room. However, there are indoors other noise sources that emit infrared rays (infrared light), such as indirect lighting, downlight, infrared stove, etc. Moreover, when the information processing apparatus 10 is outdoors, a noise is caused by sunlight.

Figure 2B:
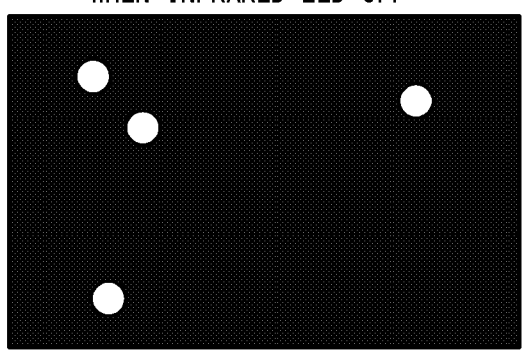
FIG. 2(B) is an illustration view showing a non-limiting example infrared image when the infrared LED is turned off in the case where there is little influence by noise.

An example of the second infrared image 150 when the infrared LED 26 is turned off (at an off-time) is shown in FIG. 2(B). However, an imaging target (imaging object) of the imaging device 24 is substantially the same between the infrared LED 26 is turned on and when it is turned off.

In the second infrared image 150 shown in FIG. 2(B), since the infrared LED 26 is turned off, the infrared rays from the infrared LED 26 are never reflected on the palm. Therefore, only the noise due to the sunlight or the light of the fluorescent lamp is included in the second infrared image 150. As shown also in FIG. 2(B), the examples of FIG. 2(A)-FIG. 2(C) are shown in a case where there is comparatively little influence by the noise.

Figure 2C:
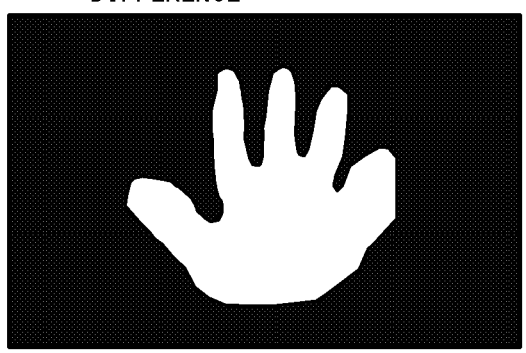
FIG. 2(C) is an illustration view showing a non-limiting example difference image of the infrared image at an on-time shown in FIG. 2(A) and the infrared image at an off-time shown in FIG. 2(B).

FIG. 2(C) shows a difference image 200 of the first infrared image 100 shown in FIG. 2 (A) and the second infrared image 150 shown in FIG. 2(B). As shown in FIG. 2(C), in the difference image 200, a noise is eliminated and an image of the palm is included.

The coordinate data of the position corresponding to the image of the palm (bright part) thus acquired is applied to the processor 12, and is used for processing of the information processing program that is to be executed by the processor 12.

Moreover, although the above-described information processing program is a game program as an example, there is no necessity of being limited to this. As long as being a program that performs processing based on an infrared image, further programs such as a user authentication program, a document creation program, an email program, a drawing program, a character practice program, a language training program, a learning program, etc. may be used.

In the examples shown in FIG. 2(A)-FIG. 2(C), it is possible to remove a noise by calculating the difference image 200 between the first infrared image 100 and the second infrared image 150. That is, the imaging device 24 (image processing circuit 24d) has a noise removing function, and it is shown that the function concerned is working.

On the other hand, even there is such a noise removing function, since an influence by noise is large when the sunlight or/and the light of fluorescent lamp are intense, an entire infrared image becomes whitish. In this case, the noise removing function of the imaging device 24 does not work.

Figure 3A:
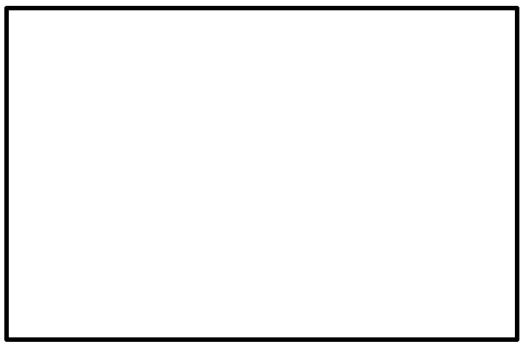
FIG. 3(A) is an illustration view showing a non-limiting example infrared image when the infrared LED is turned on in a case where there is large influence by noise.
Figure 3B:
FIG. 3(B) is an illustration view showing a non-limiting example infrared image when the infrared LED is turned off in the case where there is large influence by noise.
Figure 3C:
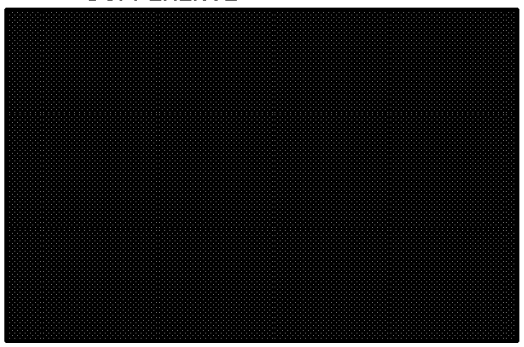
FIG. 3(C) is an illustration view showing a non-limiting example difference image of the infrared image at an on-time shown in FIG. 3(A) and the infrared image at an off-time shown in FIG. 3(B).

As shown in FIG. 3(A) and FIG. 3(B), when the sunlight or/and the light of fluorescent lamp are intense, in either of a case where the infrared LED 26 is turned on and a case where it is turned off, the infrared images (100, 150) with entirely high brightness are obtained. Therefore, in such a case, as shown in FIG. 3(C), the difference image 200 becomes completely dark. This makes it impossible to detect or recognize a part of the body such as the finger or/and the head of the user, and to use a result thereof for the information processing to be performed in the information processing apparatus 10.

Therefore, in such a case, it is necessary to notify the user that it is in a state where at least information processing using an output of the infrared sensor cannot be performed. For example, if the imaging device 24 notifies (outputs to) the processor 12 that information processing using the output of the infrared sensor cannot be performed, the processor 12 displays on the LCD 14 a message indicating that information processing using the output of the infrared sensor cannot be performed. However, the message may be output by voice from the speaker 16, and instead of the message, a warning sound (notification sound) may be output from the speaker 16. Depending on the content of the information processing, however, it may be considered that there is a case where it is sufficient to notify the processor 12 from the imaging device 24 that the information processing using the output of the infrared sensor cannot be performed.

However, in lieu of notifying the above-described content, or together with notifying the above-described content, it may be notified that if the user wants to perform the information processing using the output of the infrared sensor, the user should move to a place difficult to receive an influence of noise such as sunlight.

Accordingly, in this first embodiment, when a program (information processing program) using a detection result of the infrared sensor is to be executed, the information processing apparatus 10 determines according to the request from the program, for example whether processing (information processing) using the output of the infrared sensor can be performed. That is, advisability of use of the output of the infrared sensor is determined. However, as described above, since it is notified when information processing using the output of the infrared sensor cannot be performed, it can be said that it is determined whether it should be notified to the user that information processing using the output of the infrared sensor cannot be performed. Moreover, in some cases, it can be said that it is determined whether an infrared sensor can be used, or it can be said that it is determined whether to stop (or continue) the progress of the information processing using the output of the infrared sensor.

Such determination can also be said to be evaluation related to an infrared image that is detected (imaged) by an infrared sensor. For example, a situation of noise (noise situation) of the infrared image that is detected (imaged) by the infrared sensor is estimated (evaluation of the noise situation is performed). Although a specific determination method will be described in the following, processing about this determination method is the above-described second processing.

The image processing circuit 24d acquires the first infrared image that is imaged when the infrared LED 26 is turned on, and acquires the second infrared image that is imaged when the infrared LED 26 is turned off. About each of the first infrared image and the second infrared image, it is determined for each pixel whether a numerical value of brightness exceeds a predetermined threshold value s. Then, the image processing circuit 24d detects (calculates) the number A of pixels each of which the numerical value of brightness (brightness value) exceeds the predetermined threshold value s in the first infrared image (hereinafter, called "first pixel number"). In the same manner, the image processing circuit 24d detects (calculates) the number B of pixels each of which the numerical value of brightness (brightness value) exceeds the predetermined threshold value s in the second infrared image (hereinafter, called "second pixel number"). That is, the noise such as the sunlight is quantified.

In this first embodiment, a brightness value is expressed with the numerical value of 0-255, a maximum value of brightness (the brightest) is 255 and a minimum value of brightness (the darkest) is 0 (zero). Moreover, the predetermined threshold value s is a numerical value experientially acquired through experiment etc., and is a reference value for determining whether a pixel (image) is bright, for example, is set as 200.

In addition, when another sensor is used instead of the infrared sensor of this first embodiment, other numerical values may be set for a range of brightness value and the reference value. That is, the above-described numerical values indicative of a range of brightness value and the reference value are mere examples, and should not be limited.

The second pixel number B is the number of the pixels each of which is made to be brighter by noises such as sunlight. Therefore, by subtracting the second pixel number B from the first pixel number A, and dividing a subtracted result (A-B) by the first pixel number A, it is possible calculate a numerical value R (a term "reliability" is used hereinafter) for evaluating advisability of use of the output of the infrared sensor related to the infrared image, which is normalized between 0-1. However, as described above, the reliability R can also be called a numerical value for performing evaluation related to the infrared image that is detected by the infrared sensor. That is, the reliability R is calculated according to Equation 1.

$$R=(A-B)/A \quad \text{[Equation 1]}$$

In addition, in the ideal environment free from noise, the second pixel number B is 0 (zero), and as can be also seen from Equation 1, the reliability R becomes 1 (maximum value). Moreover, as the second pixel number B approaches the first pixel number A, the reliability R approaches 0 (minimum value). In the example shown in FIG. 3(A) and FIG. 3(B), the first pixel number A is equal to the second pixel number B, and the reliability R is 0 (zero).

In this first embodiment, when the reliability R exceeds a predetermined threshold value r, it is determined that the output of the infrared sensor can be used for information processing, and when the reliability R is equal to or less than the predetermined threshold value r, it is determined that the output of the infrared sensor cannot be used for information processing.

However, the threshold value r is a reference value for determining whether the output of the infrared sensor can be used for information processing, and is decided through experiment etc. Moreover, the threshold value r is variably set according to a kind of program using the detection result of the infrared sensor (according to the contents of the information processing). As an example, the threshold value r is set to 0.7. Furthermore, although it is determined that the output of the infrared sensor can be used for information processing when the reliability R exceeds the threshold value r in this first embodiment, it may be determined that the output of the infrared sensor can be used for information processing when the reliability R is equal to or larger than the threshold value r.

Moreover, although the reliability R is calculated in the first embodiment, conversely, it can also be said that a noise situation of the infrared image is detected (estimated). That is, when the reliability R is high, a noise is small, and when the reliability R low, a noise is large. Therefore, the threshold value r can be said to be a value for determining whether a noise contained in the infrared image is large or small.

Since the noise situation in the infrared image is thus estimated based on the acquired (imaged) first infrared image and the second infrared image in the first embodiment, it can be thought that a noise situation is estimated for each of the first infrared image and the second infrared image. However, since the information processing apparatus 10 is utilizes for the information processing a detection result obtained by detecting a part of the body of the user or a predetermined object held to or attached to the user, which is contained in the first infrared image, strictly speaking, the noise situation in the first infrared image is estimated.

Moreover, in this first embodiment, since the reliability R (or "average value Rm" described later) is calculated based on the first infrared image and the second infrared image having already acquired (imaged), it can be said that a noise situation of the infrared image in the past is estimated. On the other hand, in the meaning called estimation, it can also be said that a noise situation in the infrared image currently being imaged or an infrared image to be imaged next is estimated based on the first infrared image and the second infrared image that are acquired just before.

As described above, although it is possible to calculate the reliability R according to Equation 1, since the reliability R may be varied temporarily (locally), in this first embodiment, the average value Rm of i pieces of the reliabilities R calculated for a predetermined time period (1 second, for example) is calculated, and it is determined whether this average value Rm exceeds the above-described threshold value r.

In addition, when calculating the average value Rm, all the reliabilities R may be used, or the reliability R that significantly differs from the other reliabilities R may be excluded. Moreover, it does not need to be limited to the average value Rm, and another representative value may be used. The other representative value corresponds to a median value or a mode value.

Moreover, the calculation of the average value Rm and the determination using the threshold value r are not only performed once at the time of start of the information processing apparatus 10 or at the time of execution (start) of the information processing program, but also always performed during the driving (operating) of the infrared sensor. Therefore, when the information processing apparatus 10 is brought out to outdoors from indoors, it is possible to notify in real time the user that it becomes impossible to use the output of the infrared sensor for the information processing. Inversely, it is also possible to notify the user in real time that the output of the infrared sensor becomes able to be used when the information processing apparatus 10 is brought into indoors from outdoors.

Furthermore, although information related to the brightness of the entire infrared image is calculated (detected) by determining whether the numerical value of the brightness of each of all the pixels included in the infrared image exceeds the predetermined threshold value s, it does not need to be limited to this. For example, the information related to the brightness of the entire infrared image may be calculated by determining whether the numerical value of the brightness of each of some pixels included in the infrared image exceeds the predetermined threshold value s.

Figure 4:
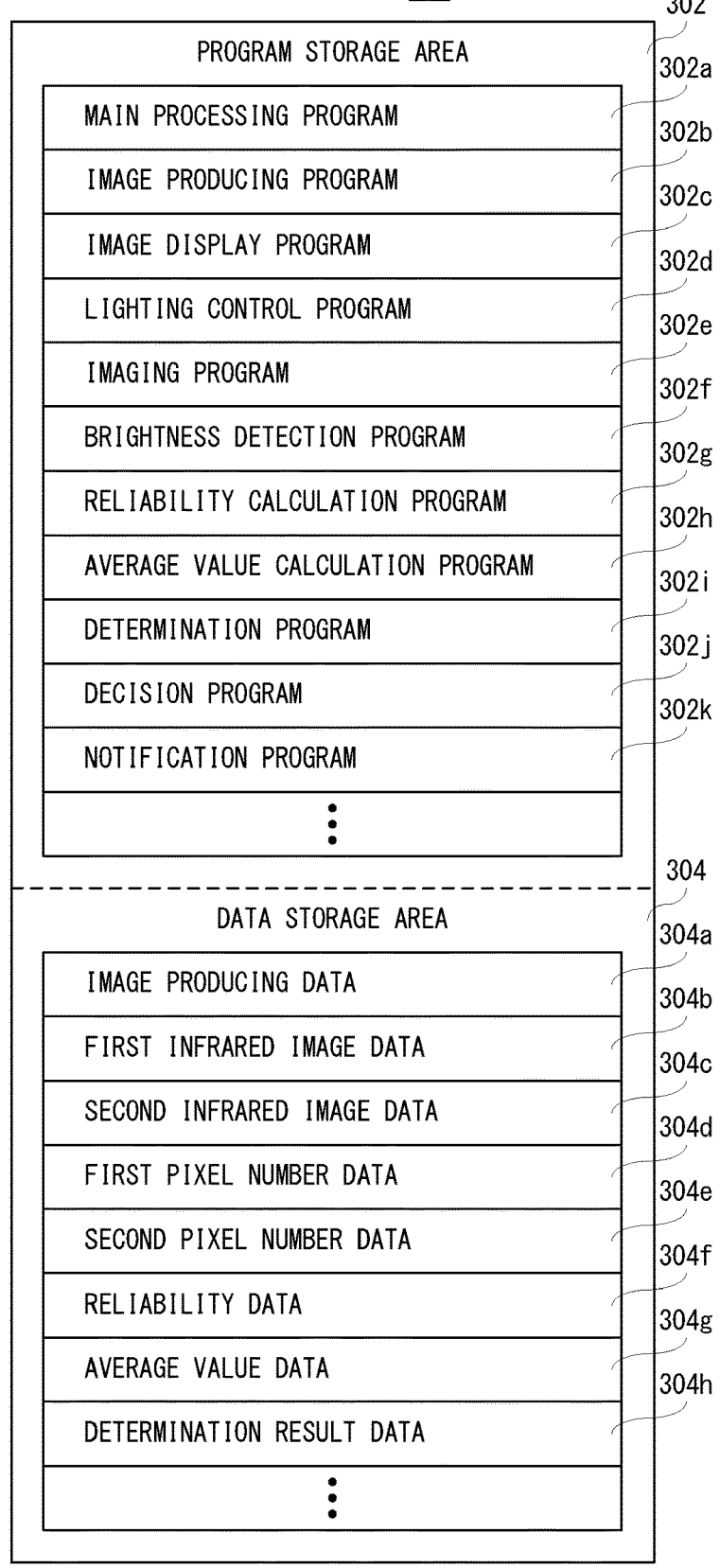
FIG. 4 is an illustration view showing a non-limiting example memory map of a RAM shown in FIG. 1.

FIG. 4 is an illustration view showing a non-limiting example memory map 300 of the RAM 20 shown in FIG. 1. As shown in FIG. 4, the RAM 20 includes a program storage area 302 and a data storage area 304. The program storage area 302 is stored with an information processing program (application program) such as a game program. For example, a part or whole of the information processing program is read from the flash memory 22 to be stored in the RAM 20 at a proper timing after a power supply of the information processing apparatus 10 is turned on.

In addition, instead of the flash memory 22, the information processing program may be acquired from a memory or optical disk that is attachable to or detachable from the information processing apparatus 10, or may be acquired (downloaded) directly or via a network from a further information processing apparatus (computer) different from the information processing apparatus 10.

In this first embodiment, the information processing program includes a main processing program 302a, an image producing program 302b, an image display program 302c, a lighting control program 302d, an imaging program 302e, a brightness detection program 302f, a reliability calculation program 302g, an average value calculation program 302h, a determination program 302i, a decision program 302j, a notification program 302k, etc.

However, the main processing program 302a, the image producing program 302b, the image display program 302c, the determination program 302j and the notification program 302k are executed by the processor 12, but other programs (302d-302i) are executed by the image processing circuit 24d (DSP).

The main processing program 302a is a program for processing a main routine about information processing (application processing). The image producing program 302b is a program for producing image data corresponding to an image to be displayed on the LCD 14 using image producing data 304a including data such as polygon data, texture data, etc. The image display program 302c is a program for outputting to the LCD 14 the image data that is produced according to the image producing program 302b.

The lighting control program 302d is a program for controlling turning-on and turning-off of the infrared LED 26. The imaging program 302e is a program for causing the image sensor 24c to perform imaging, and to produce an infrared image. The brightness detection program 302f is a program for detecting the brightness value of each pixel of the imaged infrared image.

The reliability calculation program 302g is a program for detecting (calculating) the first pixel number A that the brightness value exceeds the threshold value s among the pixels included in the first infrared image that is acquired when the infrared LED 26 is turned on, detecting the second pixel number B that the brightness value exceeds the threshold value s among the pixels included in the second infrared image that is acquired when the infrared LED 26 is turned off, and calculating the reliability R according to Equation 1. For example, the reliability R is calculated for each frame.

The average value calculation program 302h is a program for calculating the average value Rm of a plurality of reliabilities R. However, the plurality of reliabilities R are calculated for a predetermined time period (for example, 1 second). The determination program 302i is a program for determining whether the output of the infrared sensor can be used for information processing based on the average value Rm of the reliability R, and outputting (notifying) a determination result to the processor 12.

The decision program 302j is a program for deciding whether the information processing using the output of the infrared sensor is to be performed according to the determination result of the determination program 302i. The notification program 302k is a program for displaying a message indicating that the output of the infrared sensor cannot be used for information processing on the LCD 14 when it is notified that the output of the infrared sensor cannot be used for information processing. At this time, the above-described image producing program 302b and the image display program 302c are also executed.

In addition, although illustration is omitted, the program storage area 302 is stored with other programs required for performing the information processing.

In the data storage area 304, image producing data 304a, first infrared image data 304b, second infrared image data 304c, first pixel number data 304d, second pixel number data 304e, reliability data 304f, average value data 304g, determination result data 304h, etc. are stored.

The image producing data 304a is data of polygon data, texture data, etc. for producing image data corresponding to an image (screen) to be displayed on the LCD 14. The first infrared image data 304b is image data of the first infrared image 100 that is imaged by the image sensor 24c when the infrared LED 26 is turned on. However, when a plurality of first infrared images 100 are imaged, image data of respective first infrared images 100 are stored in the data storage area 304 according to a time series. This is the same also about the second infrared image 150. The second infrared image data 304c is image data of the second infrared image 150 that is imaged by the image sensor 24c when the infrared LED 26 is turned off.

The first pixel number data 304d is numerical data about the first pixel number A. The second pixel number data 304e is numerical data about the second pixel number B. The reliability data 304f is numerical data for each of a plurality of reliabilities R for a predetermined time period. The average value data 304g is numerical data about an average value Rm of the plurality of reliabilities R. The determination result data 304h is flag data indicating a determination result on whether the output of the infrared sensor can be used for information processing.

Although illustration is omitted, the data storage area 304 is stored with other data required for performing the information processing is stored, and provided with a counter(s) (timer(s)) required for performing the information processing.

Figure 5:
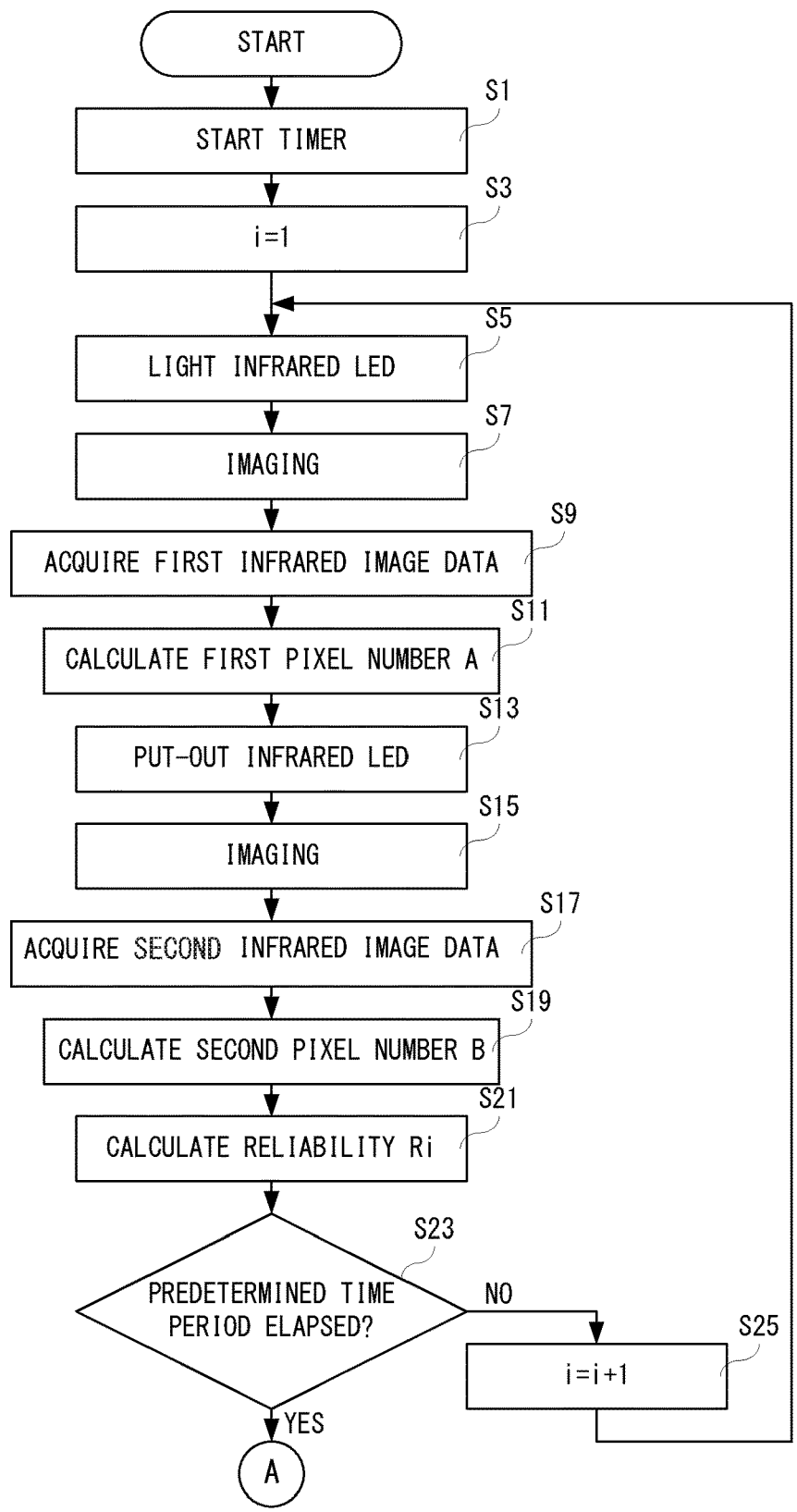
FIG. 5 is a flow chart showing a part of a non-limiting example determination control processing of an image processing circuit shown in FIG. 1.
Figure 6:
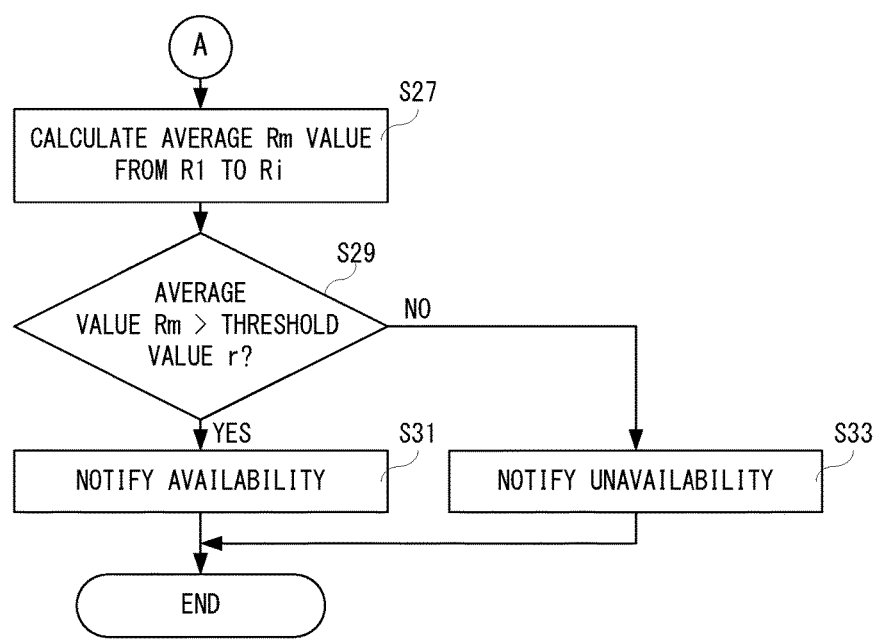
FIG. 6 is a flow chart showing a further part of the non-limiting example determination control processing of the image processing circuit shown in FIG. 1, following FIG. 5.

FIG. 5 and FIG. 6 are flow charts showing non-limiting example determination control processing of the image processing circuit 24d (DPS) shown in FIG. 1. In addition, this determination control processing corresponds to the second processing. Moreover, the determination control processing is started and repeatedly performed according to an instruction from the processor 12, i.e., according to a request from the information processing (application processing).

In addition, it is pointed-out in advance that processing in respective steps in the flow charts shown in FIG. 5 and FIG. 6 are mere examples, and as long as the same result is obtained, an order of the respective steps may be changed. Moreover, in this first embodiment, it is assumed that the image processing circuit 24d performs the processing of each step of the flowcharts shown in FIG. 5 and FIG. 6; however, some steps may be performed by the processor 12 or a dedicated circuit(s) other than the image processing circuit 24*d*. Moreover, if the image processing circuit 24*d* outputs the infrared image data to the processor 12, approximately all of the steps for the determination control processing shown in FIG. 5 and FIG. 6 may be made to be performed the processor 12.

As shown in FIG. 5, if the determination control processing is started, the image processing circuit 24*d* starts a timer (not shown) in a step S1. In a next step S3, an initial value is set to a variable i (i=1). However, the variable i is provided in order to identify the calculated reliability R individually.

In a next step S5, the infrared LED 26 is turned on, imaging processing is performed in a step S7, the first infrared image data 304*b* is acquired in a step S9, and the first pixel number A is calculated (detected) in a step S11. At this time, the first pixel number data 304*d* is stored. In a next step S13, the infrared LED 26 is turned off, the imaging processing is performed in a step S15, the second infrared image data 304*c* is acquired in a step S17, and the second pixel number B is calculated in a step S19. At this time, the second pixel number data 304*e* is stored.

Subsequently, according to Equation 1, the reliability Ri is calculated in a step S21. At this time, the reliability data 304*f* is stored (added). Then, it is determined in a step S23 whether a predetermined time period elapses. Here, the image processing circuit 24*d* determines whether a count value of the timer reaches the predetermined time period (1 second, for example). If "NO" is determined in the step S23, that is, if the predetermined time period does not elapse, the variable i is incremented by 1 (one) (i=i+1) in a step S25, and the process returns to the step S5. In this first embodiment, a scanning time of the steps S5-S25 is 1 (one) frame. On the other hand, if "YES" is determined in the step S23, that is, if the predetermined time period elapses, as shown in FIG. 6, the average value Rm from the reliability R1 to the reliability Ri is calculated in a step S27. At this time, the average value data 304*g* is stored.

Then, it is determined in a step S29 whether the average value Rm exceeds the threshold value r. If "YES" is determined in the step S29, that is, if the average value Rm exceeds the threshold value r, the determination control processing is ended after notifying in a step S31 the processor 12 that the output of the infrared sensor can be used. If "NO" is determined in the step S29, that is, if the average value Rm equal to or less than the threshold value r, the determination control processing is ended after notifying in a step S33 the processor 12 that the output of the infrared sensor cannot be used.

For example, the processor 12 stores the determination result data 304*h* according to the determination result on whether the output of the infrared sensor can be used for information processing to the RAM 20 when receiving notification about the determination result on whether the output of the infrared sensor can be used for information processing.

When this determination result indicates that the output of the infrared sensor cannot be used for information processing, the processor 12 displays on the LCD 14 a message that the output of the infrared sensor cannot be used for information processing. Therefore, it is notified to the user of the information processing apparatus 10 that the output of the infrared sensor cannot be used for information processing.

Moreover, according to the above-described determination result, the processor 12 decides whether the information processing (application processing) using the output of the infrared sensor (imaging device 24) is to be performed. Therefore, for example, the processor 12 decides not to perform processing based on the output of the infrared sensor (imaging device 24) when it is indicated by the above-described determination result that the output of the infrared sensor cannot be used for information processing. On the other hands, the processor 12 decides to perform processing based on the output of the infrared sensor (imaging device 24) when it is indicated by the above-described determination result that the output of the infrared sensor can be used for information processing.

Furthermore, as described above, the determination control processing shown in FIG. 5 and FIG. 6 is performed repeatedly, thereby to determine whether the output of the infrared sensor can be used for information processing in real time, and notified the determination result to the processor 12. Then, when the determination result indicates that the output of the infrared sensor cannot be used for information processing, the processor 12 displays on the LCD 14 a message that indicates that the output of the infrared sensor cannot be used for information processing. Therefore, the user of the information processing apparatus 10 is notified in real time that the output of the infrared sensor cannot be used for the information processing.

Although the determination control processing shown in FIG. 5 and FIG. 6 is repeatedly performed in this first embodiment, it does not need to be limited to this. For example, the average value Rm may be a moving average of the reliability R. In this case, the image processing circuit 24*d* (DSP) calculates the reliability R for each frame and calculates an average value Rm (moving average) for the predetermined number of reliabilities R that are calculated for each of the predetermined number of successive frames (20 to 30 frames, for example) up to the current frame. Then, it is determined for each frame whether the average value Rm exceeds the threshold value r. However, it is not necessary to include the reliability R of the current frame, and an average value Rm may be calculated about the predetermined number of reliabilities R calculated for each of the predetermined number of successive frames up to the immediately before frame. In this case, prior to calculating the reliability R of the current frame, the average value Rm may be calculated.

Moreover, in some cases, the average value Rm does not need to use the reliabilities R for the predetermined number of successive frames. For example, by providing a sensor capable of detecting a movement speed of the information processing apparatus 10, when the movement speed of the information processing apparatus 10 is comparatively slow, the average value Rm may be calculated by using the predetermined number of reliabilities R extracted with skipping 1 (one) to several frames (which may be variably set according to the movement speed) among the reliabilities R calculated for each frame. However, in such a case, the reliability R may be calculated by skipping 1 (one) to several frames and the average value Rm for the predetermined number of successive reliabilities R may be calculated.

According to this first embodiment, since the reliability about the infrared sensor or the output of the infrared sensor is calculated based on the infrared images that are acquired when the infrared LED is turned on and off, it is possible to determine based on the calculated reliability whether the output of the infrared sensor can be used for information processing. Therefore, for example, it is possible to notify the user that the output of the infrared sensor cannot be used for information processing.

Moreover, according to the first embodiment, since it is determined whether the brightness exceeds a predetermined threshold value for each pixel of the infrared image, the influence by the noise can be estimated comparatively accurately, and it can be further determined whether the output of the infrared sensor can be used for information processing comparatively accurately.

In addition, although the average value of a plurality of reliabilities calculated for each frame during a predetermined time period is calculated in the first embodiment, it does not need to be limited to this. The average value of reliability may be calculated based on an average value of the first pixel number and an average value of the second pixel number, which are calculated for each frame during the predetermined time period. However, since a frame is a constant time period, the number of the reliabilities calculated in the predetermined time period is a constant number.

Moreover, although the first pixel number and the second pixel number are calculated as information on each brightness of the first infrared image and the second infrared image and the reliability is calculated using the first pixel number and the second pixel number in the first embodiment, it does not need to be limited to this.

For example, an average value that is obtained by averaging the brightness values of all the pixels of the first infrared image (for convenience of description, here, referred to as "first average value") may be calculated and an average value that is obtained by averaging the brightness values of all the pixels of the second infrared image (for convenience of description, here, referred to as "second average value") may be calculated, and the reliability may be calculated using the first average value and the second average value instead of the first pixel number and the second pixel number. In a case where the average values obtained by averaging the brightness values of all the pixels of the infrared images are thus used as information on the brightness of the infrared image, although the accuracy in determining whether the output of the infrared sensor can be used for information processing is considered to be somewhat inferior in comparison with a case described in the first embodiment, a processing load of the processor can be reduced. Therefore, when the accuracy required in the information processing using the detection result of the infrared sensor is comparatively low, it is considered that it is sufficient that advisability of use of the output of the infrared sensor is determined with using the average values obtained by averaging the brightness values of all the pixels of the infrared images.

However, the reliability may be calculated using both the number of pixels (the first pixel number and the second pixel number) and the average value (the first average value and the second average value). As an example, it is conceivable to obtain an average value by averaging the reliability based on the pixel numbers and the reliability based on the average values. As another example, it is conceivable to selectively use, dependent on the information program, the reliability based on the pixel numbers and the reliability based on the average values. That is, based on at least one of the pixel numbers and the average values, it is determined whether the output of the infrared sensor is to be used for information processing. As described above, since it is considered that the reliability based on the average values may be somewhat inferior in accuracy to the reliability based on the pixel numbers, a weight of the reliability based on the pixel numbers may be increased.

Moreover, although the brightness values of all the pixels of the first infrared image is averaged in calculating the first average value, the brightness values of pixels included in a predetermined range (a partial region) of the first infrared image may be averaged. This is the same also about a case where the second average value is calculated. This is the same also about a case where an average value C is calculated in a second embodiment and a third embodiment described later.

Furthermore, the reliability is calculated using the first pixel number and the second pixel number and the reliability is calculated using the first average value and the second average value, and it may be determined based on each calculation result whether the output of the infrared sensor is to be used in performing the information processing.

Second Embodiment

An information processing apparatus 10 of the second embodiment is the same as the information processing apparatus 10 of the first embodiment except that it is further determined by another method whether the output of the infrared sensor can be used for information processing when the average value Rm is equal to or less than the threshold value r, and therefore, a duplicate description will be omitted.

Depending on a type (content) of information processing, there is an occasion that the output of the infrared sensor can be used for information processing in an indoors that is hard to be affected by noise such as sunlight even if the reliability R (average value Rm) is a little low. Therefore, in the second embodiment, it is determined whether the output of the infrared sensor can be used for information processing by two different methods as described above.

Specifically, when the average value Rm is equal to or less than the threshold value r, it is further determined whether the average value Rm exceeds a threshold value u. Although the threshold value u is a value smaller than the threshold value r, when an average value (average value C) that is obtained by averaging the brightness values of all the pixels of the infrared image is somewhat small, it is determined that the output of the infrared sensor can be used for information processing. However, since the brightness value varies, an average value D about all the average values C corresponding to a plurality of infrared images acquired in a predetermined time period (for example, 1 second) is calculated, and it is determined whether this average value D is less than a threshold value k.

As an example, the threshold value u is set as 0.5. Moreover, the threshold value k is a numerical value experientially acquired through experiment etc., and is set to a value that is predictable (determinable) that the information processing apparatus 10 is used indoors. Moreover, the infrared image that is acquired when calculating the average value C (average value D) is the first infrared image 100 or the second infrared image 150. However, since an influence of noise is determined (a noise situation is estimated), it is considered that the second infrared image 150 is more suitable than the first infrared image 100 to use for calculation of the average value C (average value D). Therefore, in the second embodiment, the average value D is calculated based on a plurality of second infrared images 150 acquired for the predetermined time period.

In addition, when the average value D is calculated based on a plurality of first infrared images 100, the threshold value u is set in consideration of a part for the brightness by the infrared rays irradiated from the infrared LED 26 more highly than the case where it is determined using a plurality of second infrared images 150.

Since the reliability R (average value Rm) is too low when the average value Rm is less than the threshold value u, it is impossible to use the output of the infrared sensor for information processing. On the other hand, if the average value Ci (average value D) that is obtained by averaging the brightness values of all the pixels of the second infrared image 150 is less than the threshold value k when the average value Rm exceeds the threshold value u, it is possible to use the output of the infrared sensor for information processing. However, even when the average value Rm exceeds the threshold value u, if the average value Ci (average value D) is equal to or larger than the threshold value k, the influence of sunlight or the like is too large, and therefore, the output of the infrared sensor cannot be used for information processing.

In addition, although the threshold value k is experientially determined through experiment etc., it is a value that differs dependent on the type of the information processing.

Therefore, in the second embodiment, processing of steps S51, S53, S55 and S57 are added between the step S29 and steps S31 and S33 in the determination control processing of the first embodiment shown in FIG. 5 and FIG. 6.

Figure 7:
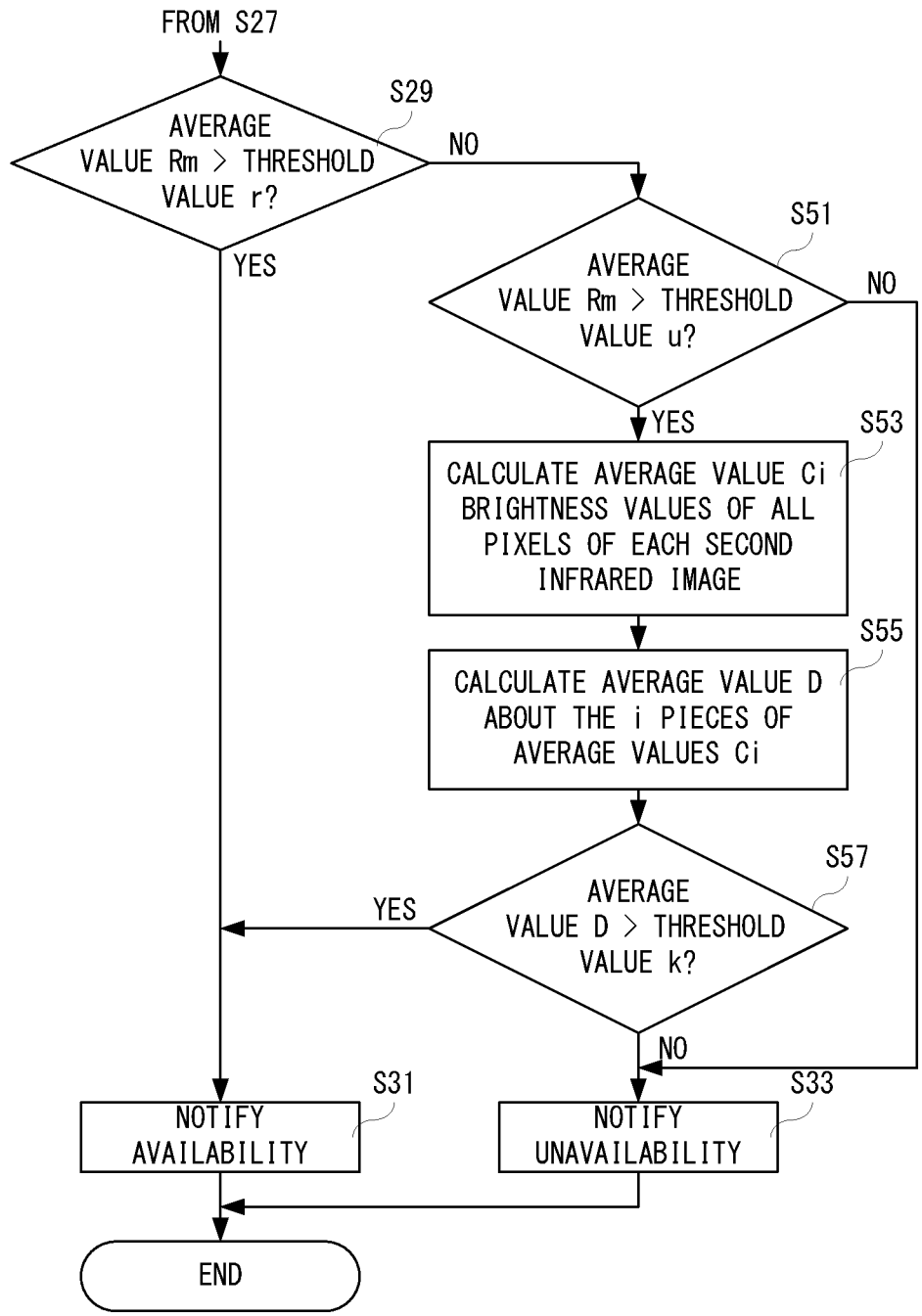
FIG. 7 is a flow chart showing another non-limiting example determination control processing of the image processing circuit shown in FIG. 1, following FIG. 5.

As shown in FIG. 7, when the average value Rm is equal to or less than the threshold value r, "NO" is determined in the step S29, and it is determined in a step S51 whether the average value Rm exceeds the threshold value u. If "NO" is determined in the step S51, that is, if the average value Rm is equal to or less than the threshold value u, the reliability is too low, and therefore, the process proceeds to the step S33.

On the other hand, if "YES" is determined in the step S51, that is, if the average value Rm exceeds the threshold value u, the average value Ci that is obtained by averaging the brightness values of all the pixels of the second infrared image 150 is calculated in a step S53, and the average value D about the i pieces of average values Ci is calculated in a step S55. Then, it is determined in a step S57 whether the average value D is less than the threshold value k.

If "YES" is determined in the step S57, that is, if the average value D is less than the threshold value k, the average value Rm is somewhat low, but since there is comparatively little influence of noise such as sunlight, the process proceeds to the step S31. On the other hand, if "NO" is determined in the step S57, that is, if the average value D is equal to or larger than the threshold value k, the process proceeds to the step S33.

According to the second embodiment, in addition to the effect of the first embodiment, a further effect can be expected. That is, even if the reliability is somewhat low, when there is almost no influence of sunlight etc. based on the average value obtained by averaging the brightness values of all the pixels of the infrared image, it is possible to determine that the output of the infrared sensor can be used for information processing. That is, since the two determination methods that criteria of determination differ are used, according to the type of information processing, it is possible to appropriately determine whether the output of the infrared sensor can be used for information processing.

Third Embodiment

An information processing apparatus 10 of the third embodiment is the same as the information processing apparatus 10 of the first embodiment except that it is roughly determined whether the output of the infrared sensor can be used for information processing prior to calculating the reliability, and according to a determination result thereof, it is determined whether the reliability is to be calculated, and therefore, a duplicate description will be omitted.

Processing that roughly determines whether the output of the infrared sensor can be used for information processing in the third embodiment is performed, similar to the processing described in the second embodiment, based on the average value obtained by averaging the brightness values of all the pixels of the second infrared image 150. However, it may be roughly determined whether the output of the infrared sensor can be used for information processing, based on the average value obtained by averaging the brightness values of all the pixels of the first infrared image 100.

Figure 8:
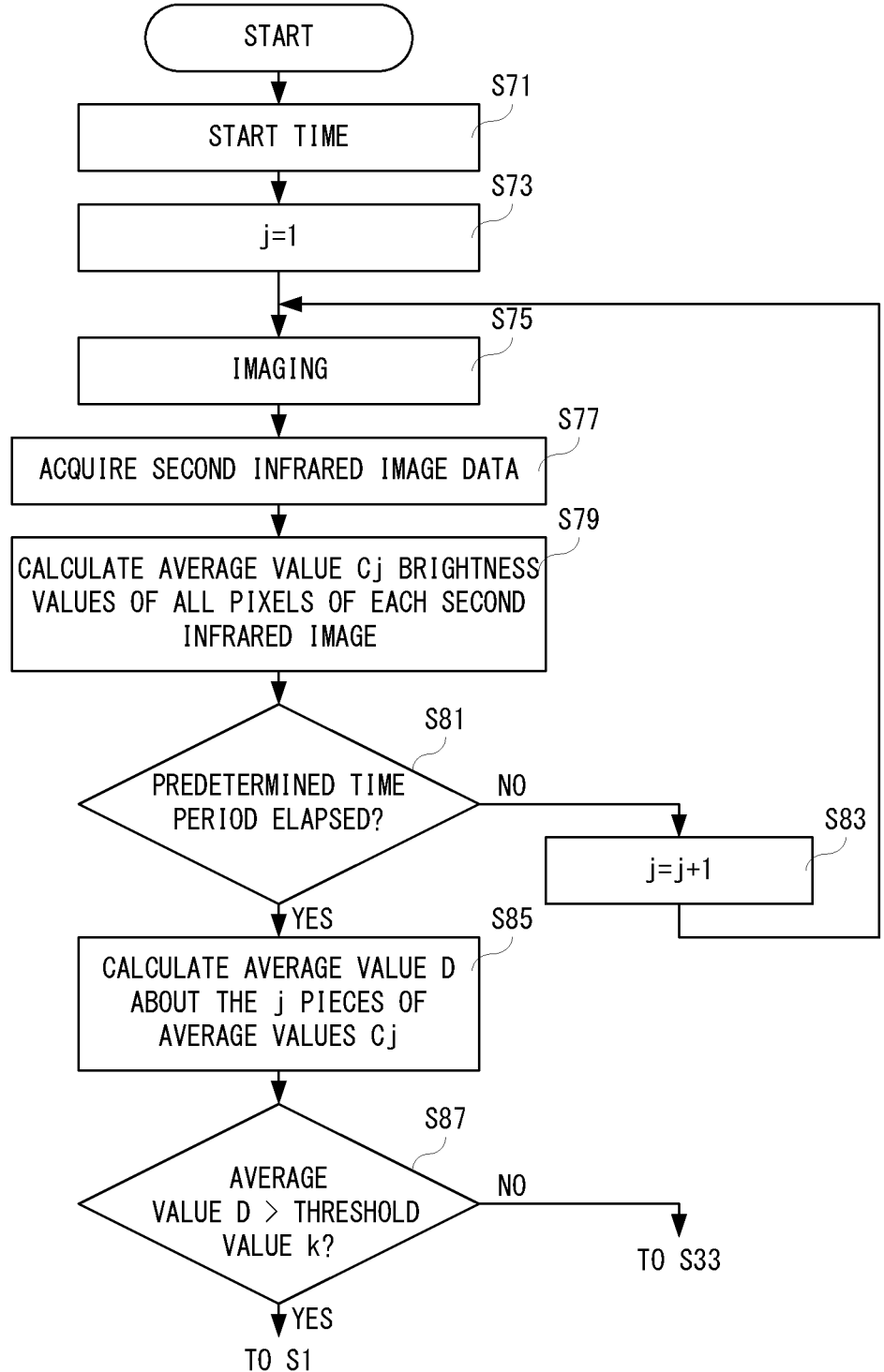
FIG. 8 shows a part of a further non-limiting example determination control processing of the image processing circuit shown in FIG. 1, being provided between the start and the step S1 shown in FIG. 5.

Specifically, as shown in FIG. 8, in the determination control processing shown in FIG. 5 and FIG. 6, processing of steps S71, S73, S75, S77, S79, S81, S83, S85 and S87 are performed prior to the step S1. In the following, the determination control processing of the third embodiment will be described, but the same processing as those described in the first embodiment and the second embodiment will be briefly described.

As shown in FIG. 8, if the determination control processing is started, a timer is started in a step S71. In a next step S73, a variable j is initialized (j=1). The variable j is provided in order to identify individually the second infrared images 150 acquired for the predetermined time period.

In a next step S75, the imaging processing is performed, the second infrared image data is acquired in a step S77, and the average value Cj that is obtained by averaging the brightness values of all the pixels of the second infrared image 150 is calculated in a step S79.

Then, it is determined in a step S81 whether the predetermined time period elapses. If "NO" is determined in the step S81, that is, if the predetermined time period does not elapse, the variable j is incremented by 1 (one) (j=j+1) in a step S83, and the process returns to the step S75.

On the other hand, if "YES" is determined in the step S81, that is, if the predetermined time period elapses, the average value D of j pieces of average values Cj is calculated. Then, it is determined in a step S87 whether the average value D is less than the threshold value k. If "YES" is determined in the step S87, the processing after step S1 shown in FIG. 5 and FIG. 6 is performed. On the other hand, if "NO" is determined in the step S87, the process proceeds to the step S33 shown in FIG. 6.

According to the third embodiment, in addition to the effect of the first embodiment, a further effect can be expected. That is, as a result that it is roughly determined whether the output of the infrared sensor can be used for information processing, only when it is determined that the output of the infrared sensor can be used, the average value of the reliability for the predetermined time period is calculated, and it is further determined based on the average value of the reliability whether the output of the infrared sensor can be used for information processing, and therefore, when it is determined that the output of the infrared sensor cannot be used as a result that advisability of use of the output is roughly calculated, it is not necessary to calculate the reliability etc., and accordingly, a processing load of the image processing circuit (processor) can be reduced. Moreover, at a possible earliest stage, the user can be notified that the output of the infrared sensor cannot be used for information processing.

Fourth Embodiment

The fourth embodiment is the same as the information processing apparatus 10 of the first embodiment except that an information processing system 80 in which an imaging unit 50 including the imaging device 24 is communicably connected to the information processing apparatus 10 is constituted, and therefore, a duplicate description will be omitted.

Figure 9:
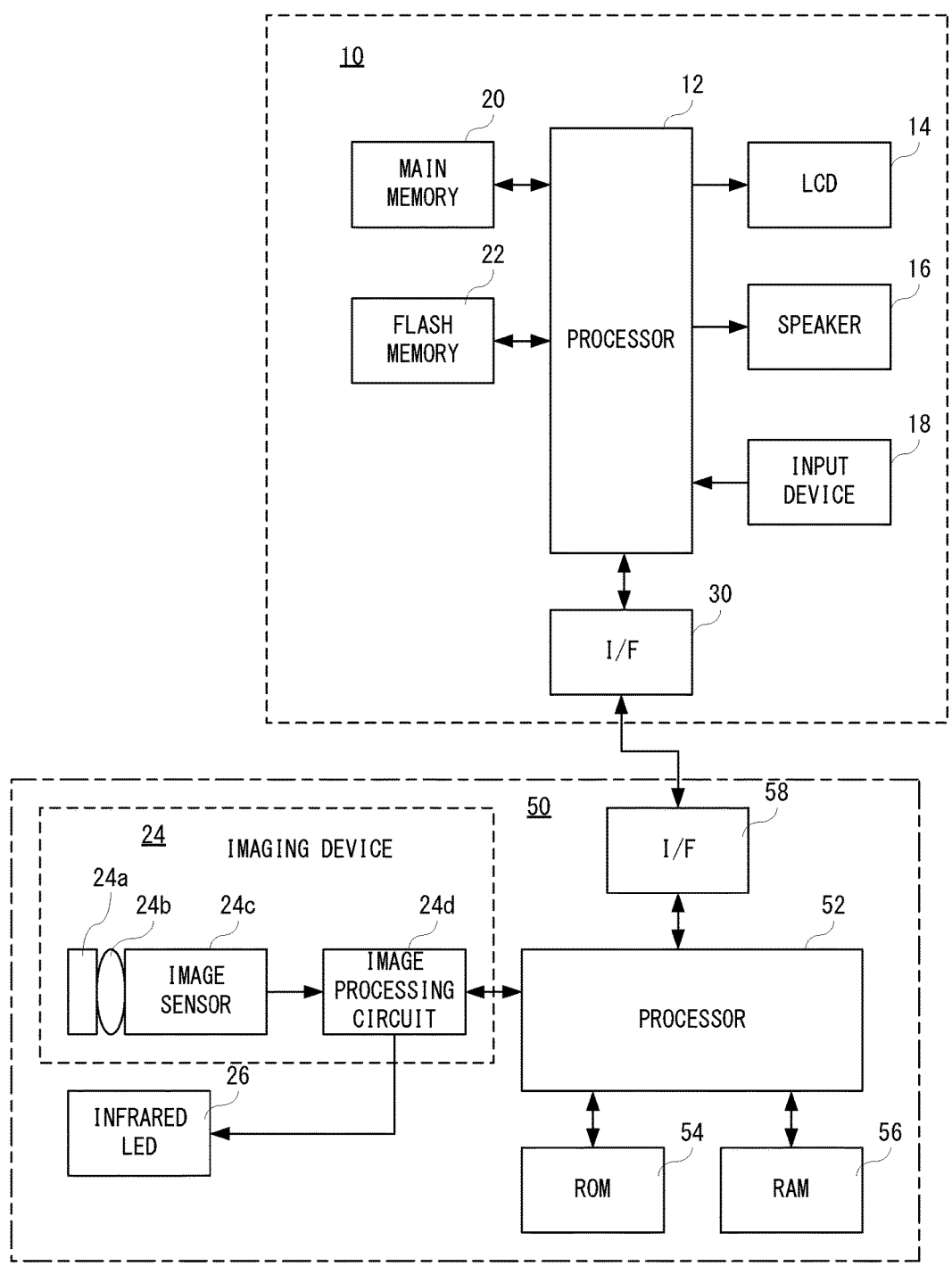
FIG. 9 is a block diagram showing non-limiting example electric structure of an information processing system.

As shown in FIG. 9, in the fourth embodiment, the information processing apparatus 10 and the imaging unit 50 are connected using a communication cables (USB cable etc.). However, the information processing apparatus 10 and the imaging unit 50 may be connected wirelessly communicably. For example, a wireless communication is performed according to a Bluetooth (registered trademark) standard, an infrared standard or a Wi-Fi standard. In such a case, instead of interfaces (30, 58) described later, a wireless communication module is provided. However, it may be constituted that the interfaces (30, 58) and the wireless communication module are provided, whereby a cable communication or a wireless communication can be selected.

In the information processing apparatus 10 of the fourth embodiment, in replaced with the imaging device 24 and the infrared LED 26 in the information processing apparatus 10 of the first embodiment, an interface (I/F) 30 is provided. The I/F 30 is an interface such as USB Type-C or Thunderbolt (registered trademark) 3, for example, which is capable of transmitting or receiving data to or from further equipment (here, the imaging unit 50) that is communicably connected to the information processing apparatus 10.

The imaging unit 50 includes the imaging device 24 and the infrared LED 26 that are provided in the information processing apparatus 10 shown in the first embodiment. Moreover, the imaging unit 50 includes a processor 52, and the imaging device 24 is connected to this processor 52, and the infrared LED 26 is connected to the imaging device 24. As described above, the imaging device 24 and the infrared LED 26 are provided in a housing of the imaging unit 50 so that an imaging direction of the imaging device 24 and a light emitting direction of the infrared LED 26 are substantially corresponding to each other.

Moreover, the imaging unit 50 further includes a ROM 54, a RAM 56 and an interface (I/F) 58 that are also connected to the processor 52. The ROM 54 is a main storage device of the imaging unit 50, and includes the above-described information processing program. The RAM 56 is used as a buffer area and a working area of the processor 52.

In the imaging unit 50, the information processing program stored in the ROM 54 is read and stored in the RAM 56. A memory map of the RAM 56 is the same as a part of the memory map 300 shown in FIG. 4. More specifically, in the fourth embodiment, the programs (302d-302i) except the main processing program 302a, the image producing program 302b, the image display program 302c, the decision program 302j and the notification program 302k, and data (304b-304h) except the image producing data 304a and the determination result data 304h in the memory map 300 shown in FIG. 4 are stored in the RAM 56.

In addition, the main processing program 302a, the image producing program 302b, the image display program 302c, the decision program 302j and the notification program 302k, and the image producing data 304a and the determination result data 304h are stored in the RAM 20 of the information processing apparatus 10.

The I/F 58 is the same as above-described I/F 30, which is capable of transmitting or receiving data to or from further equipment (here, the information processing apparatus 10) that is communicably connected to the imaging unit 50.

In this information processing system 80, the imaging device 24 incorporated in the imaging unit 50 determines whether the output of the infrared sensor can be used for information processing according to the flow charts shown in FIG. 5 and FIG. 6, as shown in the first embodiment, and a determination result thereof is notified to the processor 52. The processor 52 notifies (outputs) information (data) on whether the output of the infrared sensor can be used for information processing to the processor 12 of the information processing apparatus 10 via the I/F 58, the communication cable and the I/F 30.

In addition, when the output of the infrared sensor can be used for information processing, a result of the first processing based on the difference image 200 is transmitted to the information processing apparatus 10 from the imaging unit 50 (imaging device 24), and the result is utilized in the information processing performed with the information processing apparatus 10.

Also in the fourth embodiment, like the first embodiment, when the output of the infrared sensor cannot be used for information processing, it is possible to notify the user that the output of the infrared sensor cannot be used for information processing.

In addition, the modification of the second embodiment or the third embodiment is applicable also to the fourth embodiment.

Moreover, although the reliability is calculated in each above-described embodiment, it does not need to be limited to this. Since it is sufficient to determine whether the output of the infrared sensor can be used for information processing, degree of distrust (degree of noise) opposite to the reliability may be calculated. For example, the degree of distrust (the degree of noise) is degree of distrust about the output of the infrared sensor, or a quantity of the noise included in the infrared image acquired by the infrared sensor. Specifically, the degree of noise (noise situation) is "1−(minus) reliability", and is equivalent to a value that the second pixel number B divided by the first pixel number A. In this case, when the average value (1−Rm) of the degree of noise is equal to or larger than the predetermined threshold value r, it is determined that the output of the infrared sensor cannot be used for information processing. That is, the degree of noise (noise situation) is estimated, and it is determined based on an estimation result whether the output of the infrared sensor can be used for information processing.

Furthermore, although the average value of the plurality of reliabilities calculated for the predetermined time period, and it is determined whether the calculated average value exceeds the threshold value in each of the above-described embodiments, it does not need to be limited to this. It may be determined whether each of the plurality of reliabilities calculated in the predetermined time period exceeds the threshold value. That is, it is determined whether the output of the infrared sensor can be used for information processing depending on whether each of the plurality of reliabilities satisfies a predetermined condition. Therefore, when any one of the plurality of reliabilities does not satisfy the predetermined condition, it can be determined that the output of the infrared sensor cannot be used for information processing. In such a case, at every time that the reliability is calculated, it is determined whether the reliability satisfies the predetermined condition, and it is possible to determine that the output of the infrared sensor cannot be used for information processing at the time when it is determined that the predetermined condition is not satisfied. However, it may be determined that the output of the infrared sensor cannot be used for information processing at the time when it is determined that the predetermined number (3-5 pieces, for example) of reliabilities successively calculated do not satisfy the predetermined condition. Thus, when it is determined whether the reliability satisfies the predetermined condition at every time the reliability is calculated, it can be said that the predetermined time period defines an ending period for determining that the output of the infrared sensor can be used for information processing. That is, when it is determined whether the reliability satisfies the predetermined condition at every time the reliability is calculated, the predetermined time period does not become a factor (condition) for determining whether the output of the infrared sensor cannot be used for information processing.

Furthermore, each of the above-described embodiments, it is described that the programs (302 *e*-302 *j*) about the determination control processing for determining whether the output of the infrared sensor can be used for information processing, and for notifying the determination result is included as a part of the information processing program (application program), these programs (302 *e*-302 *j*) need not be included in the application program.

Moreover, in each of the above-described embodiments, when notifying the processor that the output of the infrared sensor cannot be used for information processing from the infrared sensor, it is notified the user that the output of the infrared sensor cannot be used for information processing; however, the user may be notified that the output of the infrared sensor can be used for information processing also when it is notified that the output of the infrared sensor can be used for information processing. In such a case, the user can know that information processing using the output of the infrared sensor is performed normally.

Moreover, as the information processing apparatus shown in each of the above-mentioned embodiments, it is applicable not only to portable electronic equipment such as portable game devices, laptop PCs, tablet PCs or smartphones, but also to stationary game devices, desktop PCs, and the like. Even indoors, the influence of sunlight or/and fluorescent lamp is changed.

Furthermore, the specific numerical values and images shown in the above embodiments are merely examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system, comprising:
a light configured to be turned on to emit infrared rays and turned off to stop emission of the infrared rays;
an imaging device, including image processing circuitry, the imaging device configured to image an infrared image;
at least one processor configured to at least perform:
a first acquisition which acquires a first infrared image that is imaged when the light is turned on;
a second acquisition which acquires a second infrared image that is imaged when the light is turned off;
a comparison which compares a first analysis result of the first infrared image that is acquired by the first acquisition with a second analysis result of the second infrared image that is acquired by the second acquisition; and
a calculation which calculates an evaluation value based on the comparison result, and a determination, based on the evaluation value, that the light be moved to a different location having less light noise and providing notification of the determination that the light be moved to a different location having less light noise.

2. The information processing system according to claim 1, wherein a light emitting direction of the light and an imaging direction of the imaging device correspond to each other.

3. The information processing system according to claim 1, wherein the first analysis result includes first brightness information related to brightness of the first infrared image and
the second analysis result includes second brightness information related to brightness of the second infrared image, and
the comparison compares the first brightness information with the second brightness information.

4. The information processing system according to claim 3, wherein the first brightness information includes information about a first pixel number each having a brightness equal to or larger than a predetermined value in the first infrared image, and
the second brightness information includes information about a second pixel number each having brightness equal to or larger than the predetermined value in the second infrared image.

5. The information processing system according to claim 3, wherein the first brightness information includes information about a first average value that is obtained by averaging the brightness values of the pixels in a predetermined range in the first infrared image, and
the second brightness information includes information about a second average value that is obtained by averaging the brightness of the pixels in a predetermined range in the second infrared image.

6. The information processing system according to claim 4, wherein the first brightness information further includes information about a first average value that is obtained by averaging the brightness values of the pixels in a predetermined range in the first infrared image, and
the second brightness information further includes information about a second average value that is obtained by averaging the brightness values of the pixels in a predetermined range in the second infrared image, and
the evaluation value is calculated based on information of the first pixel number and information of the second pixel number, and based on the information about the first average value and the information about the second average value.

7. The information processing system according to claim 1, wherein the at least one processor is further configured to perform a first determination based on the evaluation value, and the first determination determines an advisability of notification of a predetermined content.

8. The information processing system according to claim 1, wherein the first determination determines based on a plurality of evaluation values whether the predetermined processing is to be performed.

9. The information processing system according to claim 8, wherein the first determination determines that the predetermined processing is to be performed when a third average value that is obtained by averaging a plurality of evaluation values satisfies a predetermined first condition.

10. The information processing system according to claim 9, wherein the first determination is repeatedly performed, and the third average value is calculated by averaging a plurality of evaluation values for a predetermined time period at every time that an evaluation value is calculated.

11. The information processing system according to claim 8, wherein the first determination determines that the predetermined processing is not to be performed when any one of the one or more evaluation values does not satisfy the first condition.

12. The information processing system according to claim 8, wherein the first determination determines that the predetermined processing is not to be performed when the predetermined number of the evaluation values successively calculated out of the evaluation values do not satisfy the first condition.

13. The information processing system according to claim 9, wherein the at least one processor is further configured to perform a second determination which determines whether the predetermined processing is to be performed dependent on whether the first average value or the second average value satisfies a second condition that is different than the first condition, wherein
when determining that the predetermined processing is not to be performed by the first determination, it is determined whether the predetermined processing is to be performed by the second determination.

14. An image processing apparatus for imaging an infrared image, the image processing apparatus comprising:
a light configured to be turned on to emit infrared rays and turned off to stop emission of the infrared rays;
storage memory storing computer-readable instructions and at least one processor for executing the instructions so that the image processing apparatus is configured to at least perform:
an imaging of infrared images including a first acquisition which acquires a first infrared image that is imaged when the light is turned on and a second acquisition which acquires a second infrared image that is imaged when the light is turned off;
a comparison which compares a first analysis result of the first infrared image that is imaged when infrared rays are emitted with a second analysis result of the second infrared image that is imaged when the infrared rays are not emitted; and
a calculation which calculates an evaluation value based on the comparison result, and a determination, based on the evaluation value, that the light be moved to a different location having less light noise and providing notification of the determination that the light be moved to a different location having less light noise.

15. A non-transitory storage medium storing an information processing program, wherein the information processing program causes a computer comprising a light configured to emit infrared rays and an imaging device including image processing circuitry and configured to image an infrared image to perform:
control to turn on and turn off the light;
a first acquisition which acquires a first infrared image that is imaged by the imaging device when the light is turned on by the control;
a second acquisition which acquires a second infrared image that is imaged by the imaging device when the light is turned off by the control;
a comparison which compares a first analysis result of the first infrared image that is acquired in the first acquisition with a second analysis result of the second infrared image that is acquired in the second acquisition; and
a calculation which calculates an evaluation value based on the comparison result, and a determination, based on the evaluation value, that the light be moved to a different location having less light noise and providing notification of the determination that the light be moved to a different location having less light noise.

16. An information processing method in the information processing system comprising a light configured to emit infrared rays and an imaging device including a processing circuitry and configured to image an infrared image, comprising:
(a) turning on and turning off the light;
(b) acquiring a first infrared image that is imaged by the imaging device when the light is turned on;
(c) acquiring a second infrared image that is imaged by the imaging device when the light is turned off;
(d) comparing a first analysis result of the first infrared image that is acquired when the light is turned on with a second analysis result of the second infrared image that is acquired when the light emitting is turned off; and
(e) calculating an evaluation value based on the comparison result, and determining, based on the evaluation value, that the light be moved to a different location having less light noise and providing notification of the determination that the light be moved to a different location having less light noise.

* * * * *